(12) United States Patent
Langford et al.

(10) Patent No.: US 7,089,414 B2
(45) Date of Patent: Aug. 8, 2006

(54) METHOD AND APPARATUS FOR UPDATING A MICROCODE IMAGE IN A MEMORY

(75) Inventors: John Steven Langford, Austin, TX (US); Michael Youhour Lim, Leander, TX (US); Paul Edward Movall, Rochester, MN (US); Thomas Joseph Warne, Eyota, MN (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/411,414

(22) Filed: Apr. 10, 2003

(65) Prior Publication Data

US 2004/0205328 A1    Oct. 14, 2004

(51) Int. Cl.
*G06F 9/00*    (2006.01)

(52) U.S. Cl. .............................. 713/2; 713/1; 713/100; 717/168

(58) Field of Classification Search ................ 713/1, 713/2, 100; 717/168–173
See application file for complete search history.

(56) References Cited

U.S. PATENT DOCUMENTS

| | | | | |
|---|---|---|---|---|
| 6,205,548 B1 * | 3/2001 | Hasbun | ........................ | 713/2 |
| 6,308,265 B1 * | 10/2001 | Miller | ........................... | 713/2 |
| 6,317,827 B1 * | 11/2001 | Cooper | ........................... | 713/2 |
| 6,584,559 B1 * | 6/2003 | Huh et al. | ..................... | 713/2 |
| 6,615,404 B1 * | 9/2003 | Garfunkel et al. | .......... | 717/173 |
| 6,622,246 B1 * | 9/2003 | Biondi | ....................... | 713/100 |

\* cited by examiner

*Primary Examiner*—Lynne H. Browne
*Assistant Examiner*—Paul Yanchus, III
(74) *Attorney, Agent, or Firm*—Duke W. Yee; Thomas E. Tyson; Mari Stewart

(57) ABSTRACT

A method, apparatus, and computer instructions for determining validity of and updating a microcode image. Responsive to initiation of an update process, a first validity indicator is checked to determine whether a first microcode image in the memory is valid. In response to the first microcode image being valid, a second validity indicator is set indies, to indicate that a second microcode image is invalid, and the update process is allowed to update the second microcode image to form an updated microcode image. A determination is made as to whether the updated microcode image is valid. The second validity indicator is set to indicate that the updated microcode is valid if the updated image is valid. The second validity indicator is checked during booting of a data processing system. If the second validity indicator is valid, the updated microcode will be loaded.

18 Claims, 3 Drawing Sheets

METHOD AND APPARATUS FOR UPDATING A MICROCODE IMAGE IN A MEMORY

BACKGROUND OF THE INVENTION

1. Technical Field

The present invention related generally to an improved data processing system and in particular to a method and apparatus for processing data. Still more particularly, the present invention provides a method, apparatus, and computer instructions for loading code during an initial program load.

2. Description of Related Art

When a computer is started or booted, an initial program load occurs. This initial program load process is also referred to as a boot process in which instructions located on a read-only memory or a flash memory are automatically executed upon start-up or boot of the computer. A flash memory is a more common storage device for storing these instructions, which is also referred to as initial program load firmware. A flash memory is a device that retains instructions when no power is applied to the device. Further, flash memory devices may be modified through a program or software component also referred to as a flash update program. This initial program load firmware may be stored in one or more flash devices. This firmware searches for the operating system, loads the operating system, and then passes control to the operating system.

Many of the computer systems today are designed with redundant initial program load firmware, also referred to as "microcode", used to initialize hardware before the operated system can be operated and executed. This initial program load firmware may contain one or more functional microcode images. These microcode images may be referred to as "load identifiers" (LIDS). In addition to loading the operating system, a LID also may perform diagnostic processes on the hardware. As more complex computer systems are developed, additional functions are required in the initial program load firmware. In such a case, this firmware may contain multiple LIDS.

With increasing number of LIDS, the possibility of one or more LIDS having a problem or defect increases. These problems may prevent the computer system from operating properly. One solution to defective LIDS is the use of redundant images. If, during the boot process, a defective LID is encountered, then a redundant image may be used to reboot the system at that time. Further, if a particular LID is defective and does not prevent the computer system from operating, a new LID may replace the old LID through a flash update. This LID may be updated through the operating system on which the LID is currently located. Updates also may not occur properly during a flash update process. For example, a problem may occur in which corruption of a LID occurs in response to events, such as data transfer, a power glitch, or a power loss. These events may cause a portion of the code in a LID to go bad or contain an error.

One problem with these present designs is that a computer will boot or start from a portion of the initial program load firmware in a flash memory device. If a LID or microcode image is defective, the computer system will continue to boot or execute instructions until the defective code is reached. If this defective code is loaded early in the boot process, the user will be alerted to this problem quickly. If the defective code is located in a LID loaded near the end of the boot process, the user will waste valuable time waiting for the computer system to reboot. Such a problem can be frustrating and takes time that a user does not want to spend.

Therefore, it would be advantageous to have an improved method, apparatus, and computer instructions for determining whether a microcode image used in a boot or start-up process for a data processing system is valid.

SUMMARY OF THE INVENTION

The present invention provides a method, apparatus, and computer insiructions for determining validity of and updating a microcode image. Responsive to initiation of an update process, a first validity indicator is checked to determine whether a first microcode image in the memory is valid. The first validity indicator prevents a second microcode image front being updated if the first microcode inset is defective. In response to the first microcode image being valid, a second validity indicator is set to indicate that the second microcode image is invalid, and the update process is allowed to update the second microcode image to form an updated microcode image. A determination is made as to whether the updated microcode image is valid. The second validity indicator is set to indicate that the updated microcode is valid if the updated image is valid. The second validity indicator is checked during booting of a data processing system to determine whether to load the updated microcode image. If the second validity indicator is valid, the update microcode will be loaded. Otherwise, an alternative microcode image is loaded and/or an error report is generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
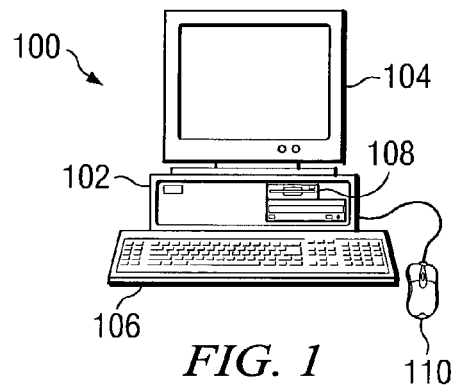
FIG. 1 is a pictorial representation of a data processing system in which the present invention may be implemented depicted in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
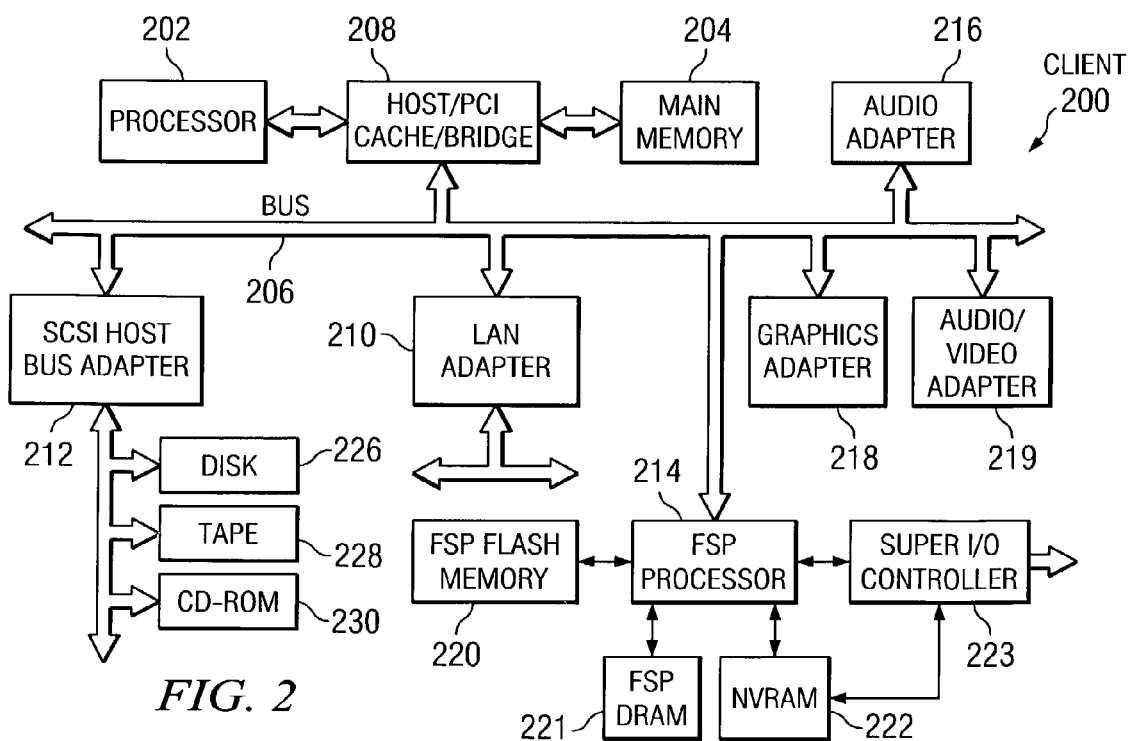
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212 and flexible service processor (FSP) processor 214 are connected to PCI local bus 206 by direct component connection. In contrast, audio adapter 216, graphics adapter 218, and audio/video adapter 219 are connected to PCI local bus 206 by add-in boards inserted into expansion slots.

FSP processor 214 is connected to FSP flash memory 220, FSP dynamic random access memory (DRAM) 221, NVRAM 222, and super I/O controller 223. Super I/O controller 223 also has a connection to NVRAM 222. All of these components form a FSP unit or module. FSP flash memory 220 is an example of the flash memory in which microcode used for an initial program load (IPL) may be stored. FSP DRAM 221 is a memory in which LIDs or microcode from FSP flash memory 220 are loaded for execution by FSP processor 214. NVRAM 222 may be used to hold data that is to be retained when the system is powered down. Super I/O controller 223 provides an interface to devices, such as a keyboard, mouse, and microphone.

SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

In this example, flash memory 232 provides storage for an initial program load firmware, which is used to initialize the hardware in data processing system 200. The present invention provides an improved method, apparatus, and computer instructions to indicate whether an initial program load firmware is defective. The mechanism of the present invention uses an indicator, such as a flag, to indicate whether this firmware is defective. This flag will prevent a data processing system, such as data processing system 200, from booting or initializing from defective firmware. Additionally, this flag also prevents firmware from being updated in a flash memory, such as flash memory 232 it a redundant device or copy of firmware is already defective. The redundant copy may be located in flash memory 232 or in another flash memory device connected to data processing system 200.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

Figure 3:
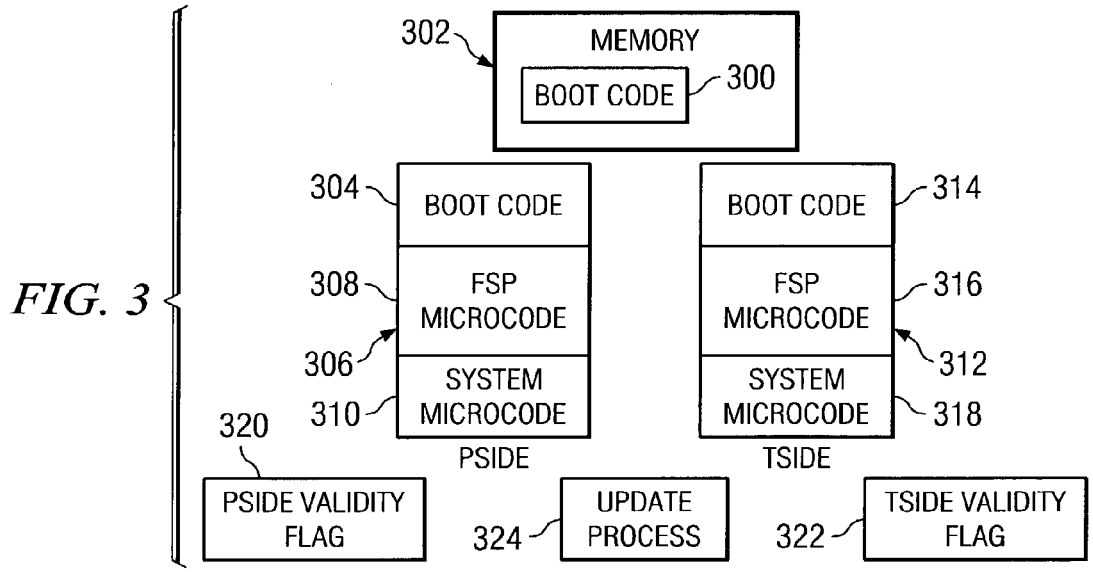
FIG. 3 is a diagram of components used in determining whether firmware is valid in accordance with a preferred embodiment of the present invention.

Turning now to FIG. 3, a diagram of components used in determining whether firmware is valid is depicted in accordance with a preferred embodiment of the present invention. In this example, boot code 300 is loaded into memory 302 when a data processing system, such as data processing system 200 is booted or initial program load begins. Memory 302 may be, for example, FSP DRAM 221 in FIG. 2. In this example, boot code 300 is a copy of boot code 304, which is located in Pside flash memory 306. Pside flash memory 306 is a permanent copy of microcode. Pside flash memory 306 also includes flexible service processor (FSP) microcode 308 and system microcode 310. In addition, Tside flash memory 312 also is present. Pside flash memory 306 and Tside flash memory 312 may be implemented using FSP flash memory 220 in FIG. 2 in these examples. This memory contains boot code 314, FSP microcode 316, and system microcode 318. This memory contains another copy of the code located in Tside flash memory 306, which is a temporary copy of the microcode. The Pside and Tside flash memory contents may or may not be identical copies. In this example, two flash memory devices are present in the system.

This code also may be used within a flexible service processor, which is a minicomputer within a main computer server. This process is used to initialize the main computer server before the main computer server may be operated. The mechanism of the present invention is not intended to be limited by the example architectures provided for purposes of illustration.

When boot code 300 is executed within memory 302, boot code 300 will check a flag, such as Pside validity flag 320 to determine whether the image within Pside flash memory 306 is valid. Validity flag 320 is stored in a nonvolatile memory. In these examples, Pside validity flag 320 may be stored within Pside flash memory 306, along with the image comprised as boot code 304, FSP microcode 308, and system microcode 310. Of course this flag could be stored elsewhere in another nonvolatile memory. If the flag is valid, boot code 300 will load other microcode images, such as SFP microcode 308 and system microcode 310, as part of the boot process.

If, on the other hand, Pside validity flag 320 indicates that microcode within Pside flash memory 306 is invalid, boot code 300 may then report a warning and will then continue to boot the computer system from the other firmware image. In this example, boot loader 300 will check Tside validity flag 322 for Tside flash memory 312. If this flag is valid, boot code 300 will continue to boot the data processing system using the images located in this flash memory. Otherwise, an error is reported and boot code 300 will look for another image if one is available. If another image is unavailable, then the boot process will halt.

In this manner, boot time is saved from preventing the computer system from booting from a defective firmware image until an error is encountered and then having to begin the boot process again using a redundant image. This mechanism also prevents a user from corrupting both initial program load firmware images, if one of those images is already damaged. For example, if the image in Pside flash memory 306 is damaged or corrupted, Pside validity flag 320 is set to indicate that the image is invalid. In this example, Tside flash memory 312 is uncorrupted and Tside validity flag 322 is set to indicate that the image is valid.

If an update is to be performed, update process 324 will check the validity flags to ensure that the valid image in Tside flash memory 312 is not the target of a valid firmware image. In other words, if the image in Pside flash memory 306 is invalid, but the image in Tside flash memory 312 is valid, the mechanism of the present invention will not allow an update of the image in Tside flash memory 312. The reason is if the update process corrupted the image, two corrupted or damaged images would be present. The mechanism of the present invention, would allow updating of Pside flash memory 306 to replace or fix the corrupted image.

Figure 4:
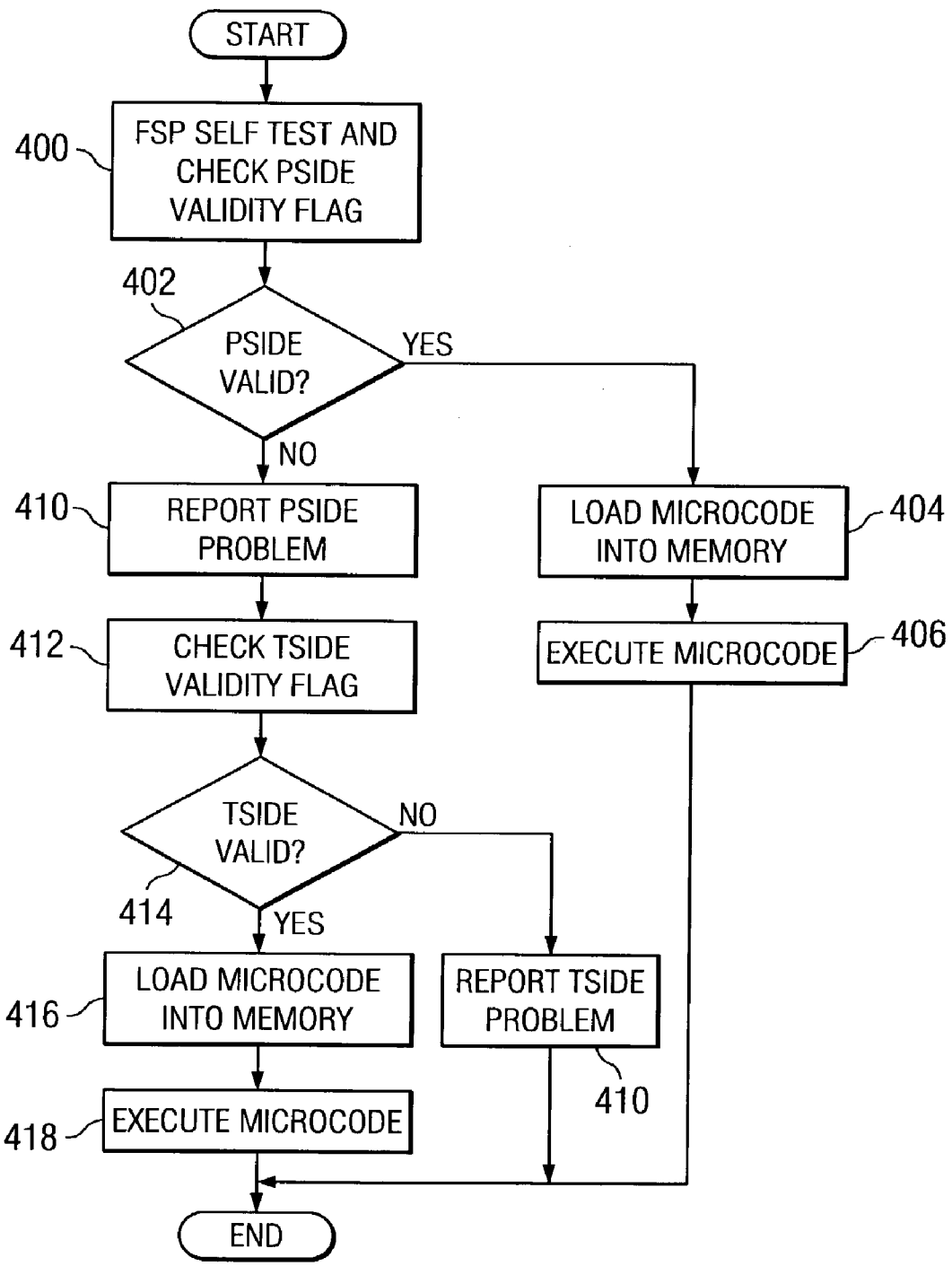
FIG. 4 is a flowchart of a process for booting or performing an initial program load in accordance with a preferred embodiment of the present invention.

Turning next to FIG. 4, a flowchart of a process for booting or performing an initial program load is depicted in accordance with a preferred embodiment of the present invention. The process implemented in FIG. 4 may be implemented in a boot code, such as boot code 300 in FIG. 3.

The process begins by performing an FSP self test and checking the Pside validity flag (step 400). A determination is made as to whether the Pside firmware image is valid (step 402). If this image is valid, the process then loads microcode into memory (step 404), and executes the microcode (step 406), with the process terminating thereafter. Steps 404 and 406 make up the IPL of the FSP.

With reference again to step 402, if the Pside firmware is not valid, a Pside problem is reported (step 410). Thereafter, the Tside validity flag is checked (step 412). Then, a determination is made as to whether the Tside firmware image is valid (step 414). If this image is valid, then the microcode is loaded into memory (step 416), and the microcode is executed (step 418), with the process terminating thereafter.

Turning back to step 414, if the Tside firmware image is not valid, then the Tside problem is reported (step 410), with the process terminating thereafter. In this instance, the boot process does not continue because both images are damaged or corrupted. If yet another redundant copy of the firmware image were present, the process then could look at that image's validity flag and use that image to boot the data processing system if it is valid. This process can continue as long as there are additional images available.

The FSP IPL process described above in FIG. 4 is one of two IPL processes that occur in booting a data processing system, such as data processing system 200 in FIG. 2. in this example, the IPL is for the FSP. Another IPL or boot process occurs for the system. In this example, in the first IPL process, power is only applied to the FSP. During this time, the FSP will perform self test operations and will initialize itself using the boot code. Then the FSP microcode is loaded into FSP memory with additional initialization and configuration processes. When the FSP is properly initialized, this component waits for the user to power on the system. When power is applied to the system, the FSP will initialize the system through a system IPL. Once the system has been initialized, system microcode is loaded into system memory, such as main memory 204 in FIG. 2. The system microcode will configure the system and load the operating system.

Figure 5:
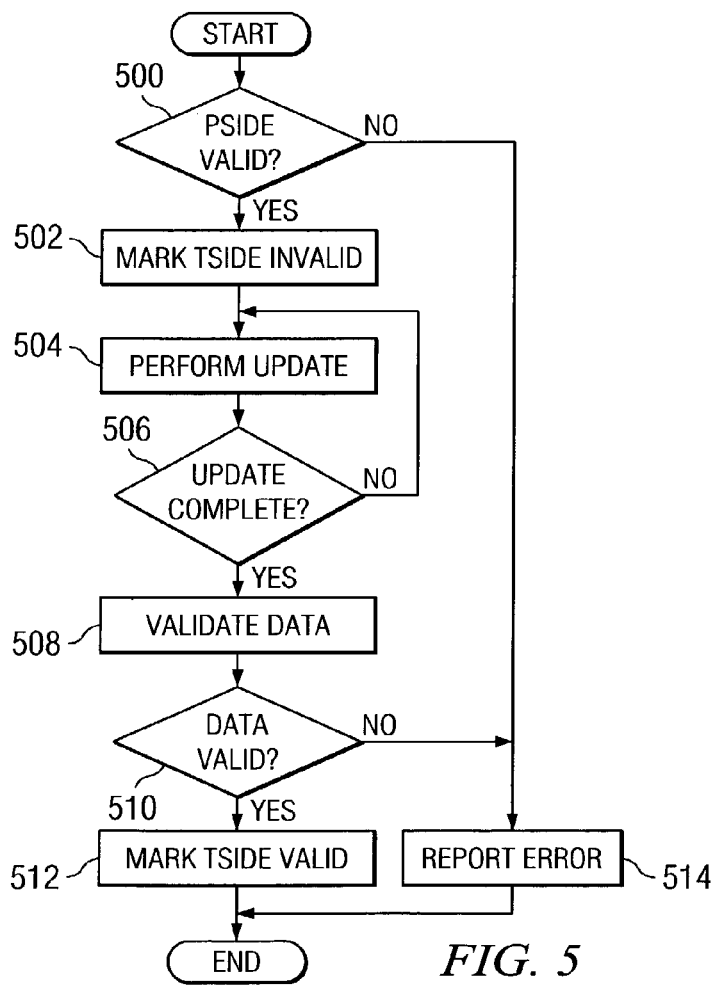
FIG. 5 is a flowchart of an update process in accordance with a preferred embodiment of the present invention.

In FIG. 5, a flowchart of an update process is depicted in accordance with a preferred embodiment of the present invention. The process illustrated in FIG. 5 may be implemented in an update process, such as update process 324 in FIG. 3.

The process begins by determining whether the Pside firmware image is valid (step 500). This determination is made when an update is desired to be temporary or Tside firmware image. If the Pside firmware image is valid, then the Tside firmware image is marked as invalid (step 502). This image is marked as invalid by setting the flag to indicate that the image is invalid. Thereafter, the update to the image is then performed (step 504). A determination is then made as to whether the update has been completed (step 506). If the update has not been completed, the process returns to step 504.

Otherwise, the data in the Tside firmware image is validated (step 508). This validation may take the form of a cyclical redundancy check (CRC) across the entire image, but is not limited to that implementation. A determination is made as to whether the data in the updated image is valid (step 510). If the data is valid, the Tside image is now marked as valid (step 512), with the process terminating thereafter.

With reference again to step 510, if the data is not valid, the process then reports the error (step 514), with the process terminating thereafter. The process also proceeds to step 514 to report an error if the Pside firmware image is invalid. In the case in which the Tside image has not been successfully updated, this image is marked as being corrupted or invalid. If the Pside firmware image is invalid, an update is not allowed to be performed to avoid the possibility of damaging the Tside firmware image.

Therefore, the present invention provides a method, apparatus, and computer instructions for determining validity of a firmware image for use in booting a data processing system and when updating of a firmware image occurs. The mechanism of the present invention saves on boot time by preventing a computer system from booting from a defective image and then having to switch to another image after the defective portion of the defective image has been encountered. This mechanism also prevents a good firmware image from being updated if a redundant image is defective. In this manner, the possibility of corrupting the good image is avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for updating a microcode image in a memory, the method comprising:
   responsive to initiation of an update process, checking a first validity indicator to determine whether a first microcode image in the memory is valid, wherein the first validity indicator prevents a second microcode image from being updated if the first microcode image is defective;
   responsive to the first microcode image being valid, setting a second validity indicator to indicate that the second microcode image is invalid allowing the update process to update the second microcode image to form an updated microcode image;
   determining whether the updated microcode image is valid; and
   setting the second validity indicator to indicate that the update microcode image valid if the updated image is valid, wherein the second validity indicator is checked during booting of a data processing system to determine whether to load the updated microcode image.

2. The method of claim 1 further comprising:
   responsive to booting of the data processing system, checking the second validity indicator; and
   loading the updated microcode image if the second validity indicator is valid.

3. The method of claim 2 further comprising:
   loading an alternative microcode image if the second validity indicator is invalid.

4. The method of claim 3 further comprising:
   reporting an error if the second validity indicator is invalid.

5. The method of claim 1, wherein a validity indicator is a flag.

6. The method of claim 1, wherein the checking and loading steps are implemented in a boot code.

7. The method of claim 1, wherein the memory is a flash memory.

8. The method of claim 1, wherein the microcode includes a flexible service processor code and a system code.

9. A data processing system for updating a microcode image in a memory, the data processing system comprising:
   checking means, responsive to initiation of an update process, for checking a first validity indicator to determine whether a first microcode image in the memory is valid, wherein the first validity indicator prevents a second microcode image from being updated if the first microcode image is defective;
   first setting means, responsive to the first microcode image being valid, for setting a second validity indicator to indicate that a second microcode image is invalid;
   allowing means for allowing the update process to update the second microcode image to form an updated microcode image;
   determining means for determining whether the updated microcode image is valid; and
   second setting means for setting the second validity indicator to indicate that the updated microcode image is valid if the updated image is valid, wherein the second validity indicator is checked during booting of a data processing system to determine whether to load the updated microcode image.

10. The data processing system of claim 9, wherein the checking means is a first checking means and further comprising:
    second checking means, responsive to booting of the data processing system, for checking the second validity indicator; and
    loading means for loading the second microcode image if the validity indicator is valid.

11. The data processing system of claim 10, wherein the loading means is a first load means and further comprising:
    second loading means for loading an alternative microcode image if the second validity indicator is invalid.

12. The data processing system of claim 11 further comprising:
    reporting means for reporting an error if the validity indicator is invalid.

13. The data processing system of claim 9, wherein the validity indicator is a flag.

14. The data processing system of claim 9, wherein the checking and loading steps are implemented in a boat code.

15. The data processing system of claim 9, wherein the memory is a flash memory.

16. The data processing system of claim 9, wherein the microcode includes a flexible service processor code and a system code.

17. A data processing system for updating a microcode image in a memory, the data processing system comprising:
    a bus system;
    a memory connected to the bus system, wherein the memory includes a set of instructions; and a processing unit connected to the bus system, wherein the processing unit executes the set of instructions to cheek a first validity indicator to determine whether a first microcode image in the memory is valid in response to initiation of an update process, wherein the first validity indicator prevents a second microcode image from being updated if the first microcode image is defective; set a second validity indicator to indicate that the second microcode image is invalid in response to initiation of an update process; allow the update process to update the second microcode image to form an updated microcode image in response to the first microcode image being valid; determine whether the updated microcode image is valid; and sot the second validity indicator to indicate that the updated microcode image is valid if the updated image is valid, wherein the second validity indicator is checked during booting of a data processing system to determine whether to load the updated microcode image.

18. A computer program product in a recordable-type computer readable medium for updating a microcode image in a memory, the computer program product comprising:

first instructions, responsive to initiation of an update process, for checking a first validity indicator to determine whether a first microcode image in the memory is valid, wherein the first validity indicator prevents a second microcode image from being updated if the first microcode image is defective;

second instructions, responsive to the first microcode image being valid, for setting a second validity indicator to indicate that the second microcode image is invalid;

third instructions for allowing the update process to update the second microcode image to form an updated microcode image;

fourth instructions for determining whether the updated microcode image is valid; and fifth instructions far setting the second validity indicator to indicate that the updated microcode image is valid if the updated image is valid, wherein the second validity indicator is checked during booting oft data processing system to determine whether to load the updated microcode image.

* * * * *